US009896111B2

(12) United States Patent
Azuma

(10) Patent No.: US 9,896,111 B2
(45) Date of Patent: Feb. 20, 2018

(54) VEHICLE AND CONTROL METHOD OF VEHICLE

(71) Applicant: KAWASAKI JUKOGYO KABUSHIKI KAISHA, Kobe-shi, Hyogo (JP)

(72) Inventor: Seiji Azuma, Harima-cho (JP)

(73) Assignee: KAWASAKI JUKOGYO KABUSHIKI KAISHA, Kobe-shi, Hyogo (JP)

( * ) Notice: Subject to any disclaimer, the term of this patent is extended or adjusted under 35 U.S.C. 154(b) by 0 days.

(21) Appl. No.: 15/110,719

(22) PCT Filed: Dec. 25, 2014

(86) PCT No.: PCT/JP2014/006457
§ 371 (c)(1),
(2) Date: Jul. 8, 2016

(87) PCT Pub. No.: WO2015/104782
PCT Pub. Date: Jul. 16, 2015

(65) Prior Publication Data
US 2016/0339924 A1 Nov. 24, 2016

(30) Foreign Application Priority Data
Jan. 9, 2014 (WO) .................. PCT/JP2014/050220

(51) Int. Cl.
B60W 50/00 (2006.01)
B60W 50/08 (2012.01)
(Continued)

(52) U.S. Cl.
CPC ........ B60W 50/0098 (2013.01); B60W 10/11 (2013.01); B60W 10/18 (2013.01);
(Continued)

(58) Field of Classification Search
CPC .. B60W 50/0098; B60W 10/18; B60W 10/20; B60W 10/11; B60W 30/02;
(Continued)

(56) References Cited

U.S. PATENT DOCUMENTS

2008/0155405 A1 6/2008 Lock et al.
2013/0261914 A1 10/2013 Ingram et al.

FOREIGN PATENT DOCUMENTS

EP 2233388 A2 * 9/2010 .......... B60W 30/182
EP 2551158 A1 1/2013
(Continued)

OTHER PUBLICATIONS

ISA Japanese Patent Office, Written Opinion of the International Searching Authority Issued in Application No. PCT/JP2014/006457, dated Mar. 17, 2015, WIPO, 5 pages.
(Continued)

Primary Examiner — Brian P Sweeney
(74) Attorney, Agent, or Firm — Alleman Hall Creasman & Tuttle LLP

(57) ABSTRACT

A vehicle comprises: a control device mounted to a vehicle body; an additional device removably mountable to the vehicle body; and an existing device mounted to the vehicle body and electrically connected to the control device, the existing device being different from the additional device, wherein the control device includes: an additional control section which performs a control to realize an additional function obtained by use of the additional device, when the control device determines that the additional device is connected to the control device; and a change control section which performs a control in such a manner that an existing function obtained by use of the existing device is changeable from the existing function in a state in which the additional device is not connected to the control device, when the
(Continued)

control device determines that the additional device is connected to the control device.

11 Claims, 2 Drawing Sheets

(51) Int. Cl.
    *B60W 10/11*     (2012.01)
    *B60W 10/18*     (2012.01)
    *B60W 10/20*     (2006.01)
    *B60W 30/02*     (2012.01)

(52) U.S. Cl.
    CPC ............ B60W 10/20 (2013.01); B60W 30/02 (2013.01); B60W 50/082 (2013.01); *B60W 2050/0062* (2013.01); *B60W 2050/0074* (2013.01); *B60W 2300/36* (2013.01); *B60W 2510/0604* (2013.01); *B60W 2510/10* (2013.01); *B60W 2520/28* (2013.01); *B60W 2710/10* (2013.01); *B60W 2710/18* (2013.01); *B60W 2710/20* (2013.01); *B60W 2720/26* (2013.01)

(58) Field of Classification Search
    CPC ........... B60W 50/082; B60W 2520/28; B60W 2050/0074; B60W 2300/36; B60W 2720/26; B60W 2510/10; B60W 2710/20; B60W 2710/18; B60W 2510/0604; B60W 2710/10; B60W 2050/0062

USPC .......................................................... 701/48
See application file for complete search history.

(56) References Cited

FOREIGN PATENT DOCUMENTS

| | | |
|---|---|---|
| JP | H0569848 A | 3/1993 |
| JP | 2007055595 A | 3/2007 |
| JP | 2008523519 A | 7/2008 |
| JP | 2011038315 A | 2/2011 |
| JP | 2013028294 A | 2/2013 |
| JP | 2013086632 A | 5/2013 |
| JP | 2013216245 A | 10/2013 |
| WO | 2013186208 A2 | 12/2013 |

OTHER PUBLICATIONS

ISA Japanese Patent Office, International Search Report Issued in Application No. PCT/JP2014/050220, dated Apr. 8, 2014, WIPO, 2 pages.
ISA Japanese Patent Office, International Search Report Issued in Application No. PCT/JP2014/006457, dated Mar. 17, 2015, WIPO, 1 page.
European Patent Office, Extended European Search Report Issued in European Application No. 14878077.8, dated Jul. 26, 2017, Germany, 7 pages.

\* cited by examiner

VEHICLE AND CONTROL METHOD OF VEHICLE

TECHNICAL FIELD

The present invention relates to a vehicle and a control method of the vehicle.

BACKGROUND ART

In a case where a rider drives the same vehicle in a public road area such as a public road and a non-public road area such as a circuit, the functions of the vehicle can be changed depending on the road area on which the vehicle travels, which becomes more convenient for the rider. Methods of changing the functions of the vehicle include, for example, a method of changing the functions by use of a switch operated by the hand of the rider (e.g., see Patent Literature 1), and a method of changing the functions in which an authentication device attached to the vehicle reads an authentication card or the like.

CITATION LIST

Patent Literature

Patent Literature 1: Japanese Laid-Open Patent Application Publication No. 2007-55595

Summary of Invention

Technical Problem

However, in the method of changing the functions by use of the switch operated by the hand of the rider, the functions are easily permitted to be changed, which is sometimes undesirable. In the method of changing the functions by use of the authentication device, the number of members increases.

In view of the above-described circumstances, the present invention has been made, and an object of the present invention is to provide a vehicle which can prevent the functions of the vehicle from being changed by an erroneous (incorrect) operation, and does not require a particular device for changing the functions of the vehicle.

Solution to Problem

According to an aspect of the present invention, a vehicle comprises: a control device mounted to a vehicle body; an additional device removably mountable to the vehicle body; and an existing device mounted to the vehicle body and electrically connected to the control device, the existing device being different from the additional device, wherein the control device includes: an additional control section which performs a control to realize an additional function obtained by use of the additional device, when the control device determines that the additional device is connected to the control device; and a change control section which performs a control in such a manner that an existing function obtained by use of the existing device is changeable from the existing function in a state in which the additional device is not connected to the control device, when the control device determines that the additional device is connected to the control device.

In accordance with this configuration, by mounting to the vehicle body the additional device required for a control performed to realize the additional function, the existing function can be controlled to be changeable from the existing function in the state in which the additional device is not connected to the control device. In other words, since the additional device required to obtain the additional function can function as a switching device for changing the existing function, specifically, a dongle, it is not necessary to additionally provide a device used exclusively for the purpose of changing the existing function. Further, unless the additional device is mounted to the vehicle body, the existing function is not changed. This makes it difficult to prevent the function from being easily changed.

In the above-described vehicle, a determiner section may contain therein an identification signal unique to the additional device which is transmitted from the additional device, and determine whether or not the additional device is connected to the control device based on whether or not a signal transmitted from the additional device includes the identification signal. In accordance with this configuration, even if a device different from the additional device is connected to the control device, it becomes possible to prevent a situation in which the control device erroneously determines that the additional device has been connected to the control device.

In the above-described vehicle, a change control section may change a driving assist control for assisting a driving operation performed by a rider, from the driving assist control in the state in which the additional device is not connected to the control device. In accordance with this configuration, since the control to be changed is the driving assist control, driving assist is properly performed depending on a traveling area in which the vehicle travels, for example, which becomes more convenient for the rider.

In the above-described vehicle, the change control section may allow the rider to select a content of driving assist of the driving operation in such a manner that the driving assist is changeable from the driving assist in the state in which the additional device is not connected to the control device. In accordance with this configuration, since the rider can select the content of the driving assist, the driving assist corresponding to the level of the rider's operation technique can be realized, which becomes more convenient for the rider.

In the above-described vehicle, the additional device may be connected to the control device according to a communication protocol by which the existing device communicates signals to and from the control device. In accordance with this configuration, since the additional device can communicate with the control device without a need to provide an interface used exclusively for the additional device, or a signal conversion device, the flexibility of a design associated with connection of the additional device is not reduced.

According to another aspect of the present invention, a control method of a vehicle in which an existing device is mounted to a vehicle body and an additional device is removably mountable to the vehicle body, comprises: when it is determined that the additional device is mounted to the vehicle body, performing a control to realize a function obtained by use of the additional device, and performing a control in such a manner that an existing function obtained by use of the existing device is changeable from the existing function in a state in which the additional device is not mounted to the vehicle body.

Advantageous Effects of Invention

In accordance with the above-described vehicle, the functions of the vehicle can be prevented from being changed by an erroneous (incorrect) operation, and a particular device for changing the functions of the vehicle is not required.

DESCRIPTION OF EMBODIMENTS

Hereinafter, the embodiment of the present invention will be described with reference to the drawings. Throughout the drawings, the same or corresponding components are designated by the same reference symbols and will not be described repeatedly.

[Overall Configuration]

Figure 1:
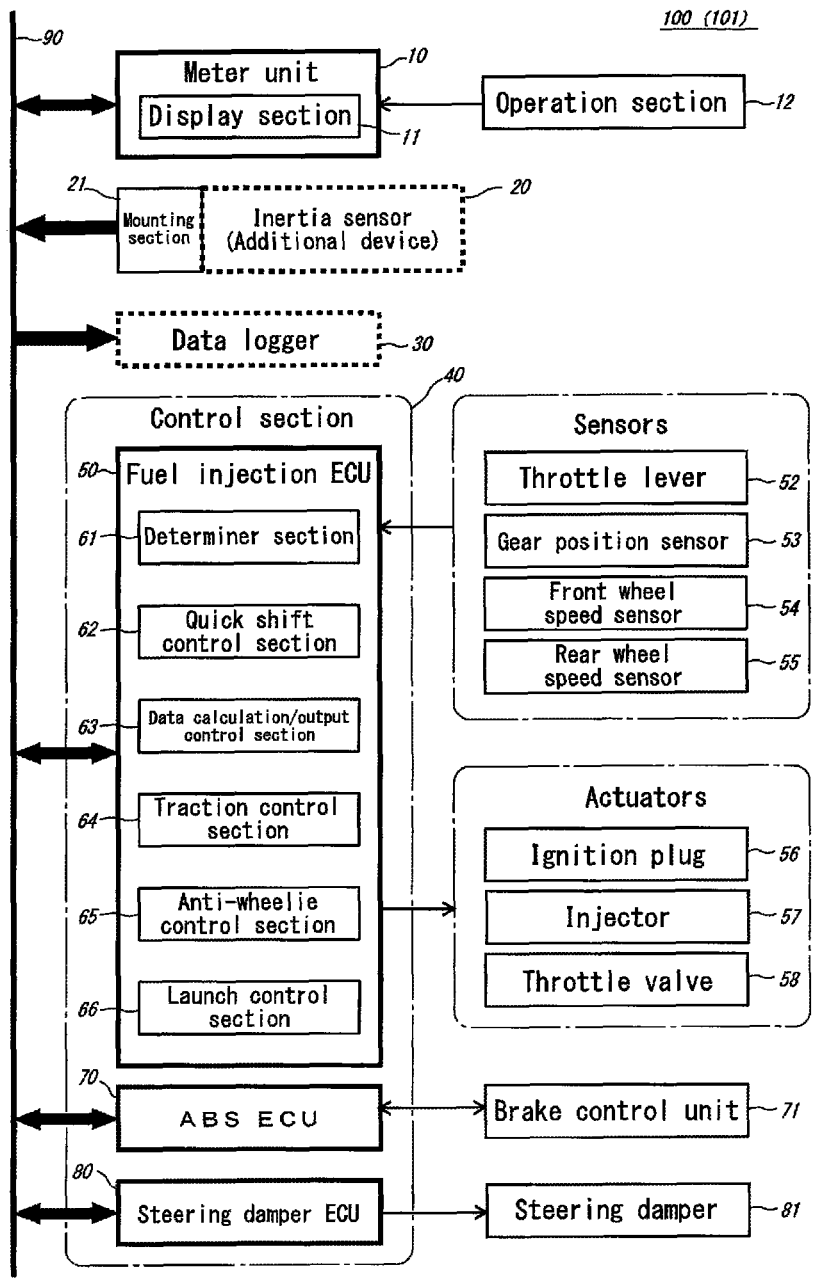
FIG. 1 is a block diagram of a control system of a vehicle according to an embodiment.

In the present embodiment, a motorcycle (two-wheeled motor vehicle) will be exemplarily described as a vehicle 100. However, the vehicle 100 may be an automated four-wheeled vehicle, a small four-wheeled vehicle, or personal watercraft, as well as the motorcycle. Further, the vehicle 100 may be a vehicle including an electric motor as a driving power source for allowing the vehicle 100 to travel, as well as a vehicle including an engine as the driving power source. FIG. 1 is a block diagram of a control system of the vehicle 100 according to the embodiment. As shown in FIG. 1, the vehicle 100 includes a meter unit 10, an inertia sensor 20, a data logger 30, and a control device 40. The control device 40 includes electronic control units such as a fuel injection electric control unit (ECU) 50, an antilock brake system (ABS)-ECU 70, and a steering damper ECU 80. Alternatively, the control device 40 may include other electronic control units. Further, it is sufficient that the control device 40 includes at least one electronic control unit.

As shown in FIG. 1, the meter unit 10, the inertia sensor 20, the data logger 30, the fuel injection ECU 50, the ABS-ECU 70, and the steering damper ECU 80 are connected to a common bus (communication line) 90, and construct a network as a whole. The above-described devices can communicate with each other by bus communication. The devices can communicate with each other according to the same communication protocol and exchange information with each other. Specifically, the devices construct a multi-channel communication network such as a controller area network (CAN). The devices have unique identification numbers, respectively. Each of the devices converts information containing the identification number at a head of a data string into a signal, and supplies (outputs) the signal to the network. In other words, each of the devices transmits to the network a signal indicative of output information and a control signal indicative of the unique identification number set in the device. Each of the devices connected to the network contains therein the identification signals unique to the devices planned to be connected to the network. Each of the devices analyzes the signal on the network, and thus determines which of the devices has output the signal to the network.

<Meter Unit>

The meter unit 10 includes a display section 11. The meter unit 10 displays a specified content on the display section 11, based on the information obtained from the network. The meter unit 10 is electrically connected to an operation section (rider switch) 12 which can be operated by a rider via a wire (hereinafter this will be referred to as a "non-bus wire") other than the bus 90. When the rider operates the operation section 12, the meter unit 10 obtains a signal transmitted from the operation section 12, executes a predetermined program to perform a required calculation, and supplies to the network data derived by the calculation.

<Inertia Sensor>

The inertia sensor 20 is a device which measures the angular velocities and acceleration rates of a vehicle body 101 by utilizing inertia. In the present embodiment, the inertia sensor 20 is capable of measuring the acceleration rates in directions of three axes and the angular velocities around two axes. Data (hereinafter this data will be referred to as "inertia data") measured by the inertia sensor 20 is supplied to the network. The inertia sensor 20 is a device removably mountable to the vehicle body 101 (mountable to the vehicle body 101 after the vehicle 100 is assembled). In the present embodiment, to perform a vehicle body control unique to a non-public road area, for example, a circuit, the inertia sensor 20 is mounted to the vehicle body 101. For example, for the rider who drives the vehicle 100 only in a public road area, the vehicle 100 which is not provided with the inertia sensor 20 is prepared. If the rider wishes to perform the vehicle body control unique to traveling in the circuit, then the rider can additionally mount the inertia sensor 20 to the vehicle 100 which is not provided with the inertia sensor 20.

The inertia sensor 20 is connected to the network via a mounting section 21. The device which uses the inertia data from the inertia sensor 20 for a calculation or a control obtains a signal including the identification signal unique to the inertia sensor 20, and performs a specified calculation or control by use of the inertia data obtained from the signal including the identification signal. The inertia sensor 20 is connected to a communication wire via which the inertia data is transmitted, and a power supply wire via which electric power is supplied from the vehicle body 101 to the inertia sensor 20. This allows the inertia sensor 20 to be driven with the electric power supplied from the power supply of the vehicle body 101. For this reason, a time period for which the inertia sensor 20 continues to output the identification signal can be increased, as compared to a case where the inertia sensor 20 contains a battery therein. Alternatively, a wire connecting the network to the mounting section 21 may be configured to be disconnected, and the disconnected portion may be placed at a location which is easily externally accessible.

<Data Logger>

The data logger 30 is a device which obtains the information supplied to the network at constant time intervals and stores therein the information in time series. As in the inertia sensor 20, the data logger 30 is removably mountable to the vehicle body 101 (mountable to the vehicle body 101 after the vehicle 100 is assembled). Since the data logger 30 does not supply the information to the network, the data logger 30 is not required to have an identification number. The data logger 30 is mounted to the vehicle body 101 to check information indicative of driving states during traveling of the vehicle 100, such as a vehicle speed, a throttle valve opening degree, and a transmission gear ratio (change gear ratio), after the vehicle 100 has traveled. For example, for the rider who need not check the driving states during traveling of the vehicle 100, the vehicle 100 which is not provided with the data logger 30 is prepared. If the rider wishes to check the driving states during traveling, then the rider can additionally mount the data logger 30 to the vehicle 100 which is not provided with the data logger 30.

<Fuel Injection ECU>

The fuel injection ECU 50 is a unit which controls the overall engine. The fuel injection ECU 50 is electrically connected to sensors (a throttle lever 52, a gear position sensor 53, a front wheel speed sensor 54, a rear wheel speed sensor 55, etc.) via non-bus wires, and obtains the rotational angle of a throttle grip, the transmission gear ratio, the rotational speed of a front wheel, the rotational speed of a rear wheel, etc., based on signals transmitted from the sensors to the fuel injection ECU 50. The fuel injection ECU 50 is also electrically connected to actuators of the engine (the actuator of an ignition plug 56, the actuator of an injector 57, the actuator of a throttle valve 58, etc.) via non-bus wires. The fuel injection ECU 50 transmits control signals to these actuators to adjust ignition timing, a fuel injection amount, and the throttle valve opening degree. In this way, the fuel injection ECU 50 controls the engine.

Although in the present embodiment, the throttle lever 52, the gear position sensor 53, the front wheel speed sensor 54, and the rear wheel speed sensor 55 are connected to the fuel injection ECU 50, these sensors may be connected to other ECUs, or the like. In this case, also, the fuel injection ECU 50 can obtain the information from these sensors via the network.

The fuel injection ECU 50 includes as functional components a determiner section 61, a quick shift control section 62, a data calculation/output control section 63, a traction control section 64, an anti-wheelie control section 65, and a launch control section 66. Hereinafter, these sections will be sequentially described.

<Determiner Section>

The determiner section 61 is a section which determines whether or not the inertia sensor 20 has been connected to the control device 40. As described above, in a state in which the inertia sensor 20 is connected to the network, the inertia sensor 20 transmits to the network the identification signal and the signal indicative of the inertia data. The determiner section 61 contains therein the identification signal of the inertia sensor 20. When the determiner section 61 receives the identification signal of the inertia sensor 20 via the network, the determiner section 61 determines that the inertia sensor 20 has been connected to the control device 40. On the other hand, when the determiner section 61 does not receive the identification signal of the inertia sensor 20 via the network, the determiner section 61 determines that the inertia sensor 20 is not connected to the control device 40.

When the determiner section 61 determines that the inertia sensor 20 has been connected to the control device 40, the determiner section 61 transmits a "connection signal" to the network. On the other hand, when the determiner section 61 determines that the inertia sensor 20 is not connected to the control device 40, the determiner section 61 transmits a "disconnection signal" to the network. Alternatively, the determiner section 61 may transmit the "connection signal" to the network only when the determiner section 61 determines that the inertia sensor 20 has been connected to the control device 40, and may not transmit any signal to the network when the determiner section 61 determines that the inertia sensor 20 is not connected to the control device 40.

Although in the present embodiment, the fuel injection ECU 50 includes the determiner section 61, another ECU may include the determiner section 61, or each of the ECUs may include the determiner section 61. In a case where each of the ECUs includes the determiner section 61, the fuel injection ECU 50 need not transmit the connection signal and the disconnection signal to the network.

<Quick shift Control Section>

The quick shift control section 62 is a section which performs a quick shift function to allow shift change to take place only by an operation of a shift pedal without operating a clutch lever. The quick shift control section 62 obtains the transmission gear ratio based on the signal transmitted from the gear position sensor 53 and controls the engine 51 so that the rotational speed of the transmission and the engine speed of the engine 51 conform to each other, during gear shifting. In a state in which the rotational speed of the transmission and the engine speed of the engine 51 conform to each other, the shift change can be performed only by the operation of the shift pedal without operating the clutch lever.

When the quick shift control section 62 receives the disconnection signal from the determiner section 61 or does not receive the connection signal from the determiner section 61, the quick shift control section 62 enables the quick shift function to be performed, only during shift up. On the other hand, when the quick shift control section 62 receives the connection signal from the determiner section 61, the quick shift control section 62 causes the rider to select either a case where the quick shift control section 62 enables the quick shift function to be performed only during shift up or a case where the quick shift control section 62 enables the quick shift function to be performed during shift up and shift down. In the present embodiment, the rider can select one of the above-described cases by use of the operation section 12 connected to the meter unit 10. Alternatively, when the quick shift control section 62 receives the connection signal from the determiner section 61, the quick shift control section 62 may not cause the rider to select one of the above-described cases, and may enable the quick shift function to be performed during shift up and shift down.

As described above, the quick shift control section 62 is a change control section which performs a control in such a manner that the existing functions obtained by use of the existing devices are changeable from the existing functions in a state in which the additional device is not connected to the control device 40, when the determiner section 61 determines that the additional device (the inertia sensor 20 in the present embodiment) is connected to the control device 40. As used herein, the "existing devices" refer to devices which are connected to the control device 40 in advance and required for the vehicle 100 to travel in the public road area. For example, the existing devices include a driving device such as an engine or an electric motor, a braking device such as a brake, a damper device such as a suspension, a steering device, a driving power transmission device, etc. In the present embodiment, the existing devices are the engine, the ABS, and the steering damper. In addition, the existing devices may include hydraulic units which are electronically controlled and used in a traction control (starting assist device, low-μ road traveling assist device), an electronically controlled suspension, a combined braking system (CBS), etc., an automatic transmission, an idling stop device, an output regulator, a vehicle speed regulator, a collision damage alleviating brake, an automatic driving device, etc.

In the present embodiment, the existing functions obtained by use of the existing devices include an anti-lock brake function and a steering damping function which will be described later, in addition to the above-described quick shift function. Driving assist controls realize these existing functions. As used herein, the "driving assist controls" refer to controls for assisting a driving operation performed by the rider, and include output controls for the driving power source (a maximum speed control, a rotational speed limiter control, a control for suppressing an output during a slip, a control for increasing an output during engine braking), and controls for assisting a vehicle driving operation (an ABS control, a control for an electronically controlled steering damper, a posture control by a dynamic damper, etc.).

<Data Calculation/Output Control Section>

When the data calculation/output control section 63 receives the connection signal from the determiner section 61, the data calculation/output control section 63 obtains the inertia data, the front wheel rotational speed, and the rear wheel rotational speed, from the inertia sensor 20, the front wheel speed sensor 54, and the rear wheel speed sensor 55, respectively, and calculates a bank angle (a tilt angle in a rightward and leftward direction from the perspective of the rider) of the vehicle body 101, and a pitch angle (a tilt angle in a forward and rearward direction from the perspective of the rider) of the vehicle body 101, based on the information received from the sensors 20, 54, 55. Then, the data calculation/output control section 63 supplies (outputs) the calculated data to the network. The calculated data supplied to the network is stored in the above-described data logger 30.

As described above, the data calculation/output control section 63 is an additional control section which performs a control to realize an additional function obtained by use of the inertia sensor 20, in a state in which the inertia sensor 20 which is an additional device is connected to the control device 40. As used herein, "additional functions" refer to functions obtained by use of the additional devices, and include a function performed by controlling the additional device, and a function obtained by performing a specified calculation or control based on the signal transmitted from the additional device. In the present embodiment, the additional functions include the calculation of the bank angle and the pitch angle performed by the data calculation/output control section 63 by use of the inertia data, and controls performed by use of the calculated bank angle and pitch angle. Further, in the present embodiment, the additional control sections which perform controls to realize the additional functions include the traction control section 64, the anti-wheelie control section 65, and the launch control section 66 which will be described later, in addition to the above-described data calculation/output control section 63.

<Traction Control Section>

The traction control section 64 is a section which performs a traction control to prevent a slip of a tire. When the traction control section 64 receives the disconnection signal from the determiner section 61 or does not receive the connection signal from the determiner section 61, the traction control section 64 obtains the front wheel rotational speed and the rear wheel rotational speed, from the front wheel speed sensor 54 and the rear wheel speed sensor 55, respectively, and calculates a target engine output which does not cause the slip of the tire, based on these information. Then, the traction control section 64 controls the engine so that an actual engine output reaches the target engine output. On the other hand, when the traction control section 64 receives the connection signal from the determiner section 61, the traction control section 64 obtains the front wheel rotational speed and the rear wheel rotational speed, from the front wheel speed sensor 54 and the rear wheel speed sensor 55, respectively, further obtains the bank angle of the vehicle body 101 from the data calculation/output control section 63, and controls the engine based on these information. In this way, the traction control section 64 controls the engine based on the information obtained from the inertia sensor 20.

<Anti-wheelie Control>

The anti-wheelie control section 65 is a section which performs an anti-wheelie control to prevent a wheelie of the vehicle body 101. When the anti-wheelie control section 65 receives the disconnection signal from the determiner section 61 or does not receive the connection signal from the determiner section 61, the anti-wheelie control section 65 obtains information relating to the control signals transmitted to the actuators and the measurement information of the sensors, and determines whether or not the wheelie of the vehicle body 101 is taking place or is highly likely to take place, based on these information. When the anti-wheelie control section 65 determines that the wheelie of the vehicle body 101 is taking place or is highly likely to take place, the anti-wheelie control section 65 reduces the output of the engine to prevent the wheelie. On the other hand, when the anti-wheelie control section 65 receives the connection signal from the determiner section 61, the anti-wheelie control section 65 obtains the information relating to the control signals transmitted to the actuators and the measurement information of the sensors, further obtains the pitch angle of the vehicle body 101 from the data calculation/output control section 63, and controls the engine based on these information. In this way, the anti-wheelie control section 65 controls the engine based on the information obtained from the inertia sensor 20.

<Launch Control Section>

The launch control section 66 is a section which performs a launch control to prevent a slip of the tire, when the vehicle 100 in a stopped state is started. The launch control is different from the traction control in that the launch control takes place when the vehicle 100 is started. However, the launch control is basically the same as the traction control in a control method. Specifically, when the launch control section 66 receives the disconnection signal from the determiner section 61 or does not receive the connection signal from the determiner section 61, the launch control section 66 obtains the front wheel rotational speed and the rear wheel rotational speed, from the front wheel speed sensor 54 and the rear wheel speed sensor 55, respectively, and calculates a target engine output which does not cause the slip of the tire, based on these information. Then, the launch control section 66 controls the engine so that an actual engine output reaches the target engine output. On the other hand, when the launch control section 66 receives the connection signal from the determiner section 61, the launch control section 66 obtains the front wheel rotational speed and the rear wheel rotational speed, from the front wheel speed sensor 54 and the rear wheel speed sensor 55, respectively, further obtains the bank angle of the vehicle body 101 from the data calculation/output control section 63, and controls the engine based on these information. In this way, the launch control section 66 controls the engine based on the information obtained from the inertia sensor 20.

<ABS-ECU>

The ABS-ECU 70 is a section which performs the anti-lock brake function to prevent the wheel from locking-up (ceasing rotation) and to thereby prevent the wheel from skidding while sudden braking is taking place. The ABS-ECU 70 is electrically connected to a brake control unit 71 via a non-bus wire, and obtains information indicative of whether or not a brake operation has been performed and the degree (magnitude) of the brake operation. In addition, the ABS-ECU 70 obtains the front wheel rotational speed and the rear wheel rotational speed from the fuel injection ECU 50, via the network. Then, the ABS-ECU 70 performs predetermined calculations based on the information indicative of whether or not the brake operation has been performed, the degree of the brake operation, the front wheel rotational speed, and the rear wheel rotational speed, and transmits the control signals to the brake control unit 71. Thus, the ABS-ECU 70 controls the brake to prevent skidding.

When the ABS-ECU 70 receives the disconnection signal from the determiner section 61 or does not receive the connection signal from the determiner section 61, the ABS-ECU 70 enables the anti-lock brake function to be performed. On the other hand, when the ABS-ECU 70 receives the connection signal from the determiner section 61, the ABS-ECU 70 causes the rider to select whether or not to enable the anti-lock brake function to be performed. In the present embodiment, the rider can select whether or not to enable the anti-lock brake function to be performed, by use of the operation section 12 connected to the meter unit 10. Alternatively, when the ABS-ECU 70 receives the connection signal from the determiner section 61, the ABS-ECU 70 may not cause the rider to select whether or not to enable the anti-lock brake function to be performed, and may disenable the anti-lock brake function to be performed. Further, instead of disenabling the anti-lock brake function to be performed, the ABS-ECU 70 may cause the anti-lock brake function to work insufficiently or retard determination of whether or not to enable the anti-lock brake function to be performed. Further, the ABS-ECU 70 may disenable the hydraulic unit of one of the front and rear wheels to assist the brake operation.

<Steering Damper ECU>

The steering damper ECU 80 is a unit which performs a steering damping function for adjusting the damping rate of a steering damper 81 which damps an oscillation of a steering device. The steering damper ECU 80 obtains the front wheel rotational speed and the rear wheel rotational speed from the fuel injection ECU 50, via the network. The steering damper ECU 80 is electrically connected to the steering damper 81 via a non-bus wire. The steering damper ECU 80 calculates a proper target damping rate based on the above-described front wheel rotational speed and rear wheel rotational speed (in other words, a vehicle speed). The steering damper ECU 80 transmits a control signal to the steering damper 81 so that an actual damping rate reaches the target damping rate.

When the steering damper ECU 80 receives the disconnection signal from the determiner section 61 or does not receive the connection signal from the determiner section 61, the steering damper ECU 80 maintains a proper relative damping rate (a target damping rate corresponding to the vehicle speed) to allow the vehicle 100 to travel in the public road area. On the other hand, when the steering damper ECU 80 receives the connection signal from the determiner section 61, the steering damper ECU 80 causes the rider to select the relative damping rate. In the present embodiment, the rider can select the relative damping rate, by use of the operation section 12 connected to the meter unit 10. Alternatively, when the steering damper ECU 80 receives the connection signal from the determiner section 61, the steering damper ECU 80 may not cause the rider to select the relative damping rate, and change the relative damping rate into a proper value which allows the vehicle 100 to travel in the non-public road area such as the circuit.

<Flow of Control>

Figure 2:
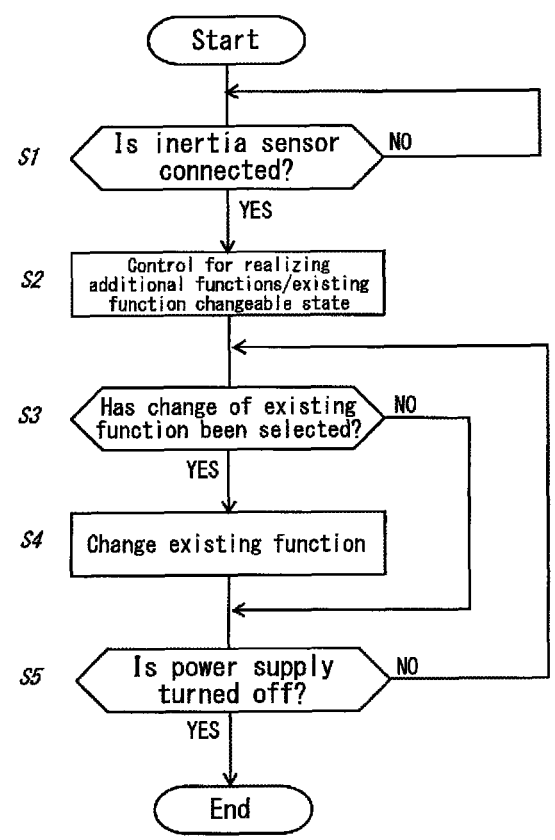
FIG. 2 is a flowchart of a control performed by a control device.

Next, the flow of the control performed by the control device 40 will be described. FIG. 2 is a flowchart of the control performed by the control device 40. The control device 40 performs the control in a procedure shown in FIG. 2. When a main switch is turned on and a power supply is turned on, the control device 40 starts the control. Upon the start of the control, initially, the control device 40 (the determiner section 61) determines whether or not the inertia sensor 20 is connected to the control device 40 (step S1). At a time point when the power supply is turned on, it is assumed that the inertia sensor 20 is not connected to the control device 40, and the control device 40 performs settings.

When the control device 40 determines that the inertia sensor 20 has been connected to the control device 40 (YES in step S1), the control device 40 moves to step S2. On the other hand, when the control device 40 determines that the inertia sensor 20 is not connected to the control device 40 (NO in step S1), the control device 40 returns to step S1 and repeats step S1 until the control device 40 determines that the inertia sensor 20 has been connected to the control device 40.

In step S2, the control device 40 controls the additional control sections (the data calculation/output control section 63, the traction control section 64, the anti-wheelie control section 65, and the launch control section 66) to perform the additional functions, respectively. Specifically, the data calculation/output control section 63 calculates the bank angle and the pitch angle of the vehicle body 101, while the traction control section 64, the anti-wheelie control section 65, and the launch control section 66 control the engine as described above based on the calculated bank angle and pitch angle of the vehicle body 101.

In addition, in step S2, the vehicle 100 shifts to an existing function changeable state in which the existing functions can be changed. In the existing function changeable state, the control device 40 displays selection images of the quick shift function, the anti-lock brake function, and the steering damping function on the display section 11 of the meter unit 10, and enables the rider to perform a selection operation for changing each of the functions. Unless the inertia sensor 20 is connected to the control device 40, the existing functions cannot be changed. In other words, only when the control device 40 determines that the inertia sensor 20 is connected to the control device 40 can the existing functions be changed. It should be noted that the existing functions can also be changed while the vehicle 100 is traveling.

Just after the vehicle 100 has shifted to the existing function changeable state, the control device 40 displays information indicating that the vehicle 100 is in the existing function changeable state, on the display section 11 of the meter unit 10. This allows the rider to see and check the information indicating that the vehicle 100 is now in the existing function changeable state, which becomes more convenient for the rider. In addition, the rider's attention can be drawn to the fact that the vehicle 100 is now in the existing function changeable state. Alternatively, at a time point when the vehicle 100 has shifted to the existing function changeable state, information displayed on the display section 11 of the meter unit 10 may be changed into information for traveling in the non-public road area, or a switch used exclusively for the purpose of traveling in the non-public road area may be displayed on the display section 11 of the meter unit 10. In this way, the information important to traveling in the non-public road area may be preferentially displayed on the display section 11 of the meter unit 10. Specifically, the information important to traveling in the circuit, for example, the engine speed, may be displayed preferentially over the vehicle speed on the display section 11 of the meter unit 10, or a transmission gear position and a lap time may be displayed in an emphasized manner on the display section 11 of the meter unit 10. Further, for convenience, a part of the functions may be stopped or changed into ones for traveling in the circuit.

Then, in step S3, the control device 40 determines whether or not change of each of the existing functions has been selected. When the control device 40 determines that the change of each of the existing functions has been selected (YES in step S3), the control device 40 changes the selected existing function (step S4). For example, in a case where enabling the quick shift function to be performed is selected, the quick shift function is performed during the shift down. In a case where disenabling the anti-lock brake function to be performed is selected, the ABS may be deactivated. In a case where the relative damping rate is selected, the steering damper is controlled based on the relative damping rate. In this way, the controls performed for traveling in the public road area can be changed into different controls for traveling in the non-public road area. The states of the existing functions are displayed on the display section 11 of the meter unit 10. In a case where the existing functions are changed, a light emitting device such as a direction indicator, a brake lamp, or a position lamp may not be turned on. This allows the rider to become aware that the vehicle 100 is going to travel in the public road area by mistake, when the vehicle 100 is going to travel in the public road area in a state in which the existing functions have been changed.

After step S4, the control device 40 moves to step S5. When the control device 40 determines that the change of each of the existing functions is not selected (NO in step S3), the control device 40 moves to step S5 without going through the step (step S4) for changing the existing function.

In step S5, the control device 40 determines whether or not the power supply has been turned off by operating the main switch. When the control device 40 determines that the power supply has been turned off (YES in step S5), the control device 40 performs a termination operation and terminates the control. If the power supply is turned on again, the control procedure starts from step S1 again. At this time, it is assumed that the inertia sensor 20 is not connected to the control device 40, and the control device 40 performs settings. Therefore, in a case where the existing functions are changed, it becomes necessary for the rider to change the existing functions intentionally, every time the vehicle 100 is started. This makes it possible to prevent a situation in which the driving assist of the driving assist device is resumed in a state in which the existing functions have been undesirably changed, after the existing functions were changed in previous traveling. On the other hand, when the control device 40 determines that the power supply has not been turned off (NO in step S5), the control device 40 returns to step S3.

As described above, in the present embodiment, when the control device 40 determines that the inertia sensor 20 has been connected to the control device 40, the additional functions are performed, and the rider can change the existing functions. Therefore, in accordance with the present embodiment, the functions of the same vehicle 100 can be changed depending on the traveling area on which the vehicle 100 travels, which become more convenient for the rider. In a state in which the inertia sensor 20 is not connected to the control device 40, the existing functions are set to be suitable for traveling in the public road area, and the settings cannot be changed into ones suitable for traveling in the non-public road area. This makes it possible to prevent a situation in which the vehicle 100 undesirably shifts to a control mode suitable for traveling in the non-public road area.

In the present embodiment, the inertia sensor 20, which is a functional device used in the calculation or control performed by the additional control sections, also functions as the dongle which is capable of changing the existing functions of the quick shift control section 62, the ABS-ECU 70, the steering damper ECU 80, and the like, which are irrelevant to the measurement data measured by the inertia sensor 20. For this reason, in accordance with the present embodiment, a particular device such as an authentication device for changing the control is not required, so there is no increase in the number of members. Unless the inertia sensor 20 is mounted to the vehicle body 101, change of the control does not take place. Therefore, a situation in which the control is changed by an erroneous (incorrect) operation does not take place. Further, since the control device 40 contains therein the programs used for performing controls to realize the additional functions and the programs used for performing controls after the existing functions have been changed, these controls can be performed without a need to change the control device 40.

Further, in the present embodiment, when the control device 40 determines that the inertia sensor 20 has been connected to the control device 40, the rider selects whether or not to change the existing functions. Thus, the present embodiment can deal with a case where the rider wishes to change the existing functions, and a case where the rider does not wish to change the existing functions. This becomes more convenient for the rider. Since the rider carries out the operation for changing the existing functions to change the existing functions, the control can be changed according to the rider's intention.

As described above, in the present embodiment, the functions can be changed by use of the operation section 12 connected to the meter unit 10. In this configuration, a present control mode can be displayed on the display section 11 of the meter unit 10. This allows the rider to perform selection, considering the present control mode. Therefore, the rider can easily perform the selection, and an erroneous operation can be prevented.

In the present embodiment, the inertia sensor 20 which is the additional device and the control device 40 can communicate with each other according to the same communication protocol via the network. The control device 40 receives the identification signal of the inertia sensor 20 and thereby can confirm that the inertia sensor 20 has been connected to the control device 40. In this configuration, the control device 40 can determine whether or not the inertia sensor 20 has been connected to the control device 40 without setting complex programs. In this way, the functions can be easily changed and a design can be made more flexible.

The present invention is not limited to the above-described embodiment, and additions, changes or deletions can be made within the scope of the invention. For example, although in the present embodiment, the driving assist controls are the quick shift function, the anti-lock brake function, and the steering damping function, the driving assist controls are not limited to these, and include general controls in which a driving intervention control takes place in response to the rider's operation.

In the present embodiment, when the power supply is turned on, it is assumed that the inertia sensor 20 is not connected to the control device 40, and the control device 40 performs the settings. Alternatively, when the control device 40 determines that the traveling of the vehicle 100 has been finished, for example, when the power supply is turned off, settings in the state in which the inertia sensor 20 is not connected to the control device 40 may be stored and maintained when the power supply is turned on.

Further, the settings of the changed existing functions may be continued while the engine is running. Further, when the stopped state of the vehicle 100 continues for a predetermined time after the vehicle 100 has traveled in a state in which the existing functions have been changed, the vehicle 100 may return to an initial state (the settings in the state in which the inertia sensor 20 is not connected to the control device 40).

Although in the present embodiment, the additional device which functions as the dongle is the inertia sensor 20, the dongle may be other functional devices. A sensor different from the inertia sensor may be used as the additional device. In this case, also, a function obtained by adding the sensor different from the inertia sensor is the additional function, and a control for realizing the additional function is the additional control. Also, a section which performs a control in such a manner that the existing function is changeable from the existing function in the state in which the additional device is not connected to the control device 40, irrelevantly to data detected by the sensor different from the inertia sensor, is the change control section. For example, a stroke sensor for detecting a stroke of a suspension may be used as the additional device. In a case where the data logger outputs the identification signal, the data logger may be the additional device. In this case, a data log function is the additional function. Further, the electronically controlled steering damper may be used as the additional device.

Further, an actuator may be used as the additional device. For example, in a case where a special actuator used for traveling on the circuit is added, this actuator may be the additional device. The electronically controlled suspension device, the electronically controlled steering damper, an electric throttle valve, or the like may be used as the additional device.

In the present embodiment, the control device 40 determines whether or not the inertia sensor 20 is connected to the control device 40, depending on whether or not the control device 40 can receive the identification signal of the inertia sensor 20 from the network. Alternatively, the control device 40 may obtain information indicative of whether or not the inertia sensor 20 is connected to the control device 40 via, for example, a non-bus wire, without use of the network.

Further, the mounting section 21 to which the inertia sensor 20 is mountable may be electrically connected to the fuel injection ECU 50 via a non-bus wire. In this configuration, the mounting section 21 may transmit a "mounting signal" to the fuel injection ECU 50 in a state in which the inertia sensor 20 is mounted to the mounting section 21, while the mounting section 21 may transmit a "dismounting signal" to the fuel injection ECU 50 in a state in which the inertia sensor 20 is not mounted to the mounting section 21. For example, in a case where the inertia sensor 20 is not mounted to the mounting section 21, the non-bus wire may be connected to a ground by, for example, mounting a dummy harness to the mounting section 21, and may be short-circuited at a time point when the inertia sensor 20 is mounted to the mounting section 21.

In this case, the determiner section 61 can determine that a problem has occurred in bus communication by the inertia sensor 20, when the determiner section 61 cannot receive the identification signal of the inertia sensor 20 via the network even though the control device 40 is receiving the mounting signal from the mounting section 21 via the non-bus wire. In other words, in accordance with this configuration, when the control device 40 cannot receive the identification signal of the inertia sensor 20, the control device 40 can determine that the present state is a state in which the inertia sensor 20 is not connected to the control device 40 or a state in which a problem has occurred in the bus communication.

Further, in the present embodiment, even after the existing functions have been changed, a state in which the vehicle 100 can travel in the public road area is maintained. Therefore, a non-public road mode is selectable for the driving assist device in a case where the vehicle is present in the non-public road area, whereas the non-public road mode is pre-set in the driving assist device in such a manner that the non-public road mode is unchangeable in a case where the vehicle is present in the public road area.

Preferably, the driving assist control is such that the driving assist is obliged to be performed or required in traveling in the public road area, for example, at a present time or in the future. Thus, in a case where a user intends to drive a vehicle in the non-public road area, the user need not purchase a vehicle which is used exclusively for the purpose of traveling in the non-public road area and for which the driving assist control is not performed. Since the vehicle itself can travel in the public road area and move to the non-public road area, it is not necessary to transport the vehicle used exclusively for the purpose of traveling in the non-public road area to the non-public road area. This becomes more convenient for the rider. The requirement of the ABS of the present embodiment for traveling in the public road area is defined in law in some cases.

LIST OF REFERENCE CHARACTERS 20 inertia sensor (additional device)
40 control device
61 determiner section
62 quick shift control section (change control section)
63 data calculation/output control section (additional control section)
64 traction control section (additional control section)
65 anti-wheelie control section (additional control section)
66 launch control section (additional control section)
70 ABS-ECU (change control section)
71 brake control unit
80 steering damper ECU (change control section)
81 steering damper
90 bus
100 vehicle
101 vehicle body

The invention claimed is:

1. A vehicle comprising:
a control device including at least one electric control unit mounted to a vehicle body;
an additional device removably mountable to a dock of the vehicle body, the dock being configured to electrically connect the mounted additional device to the control device; and
an existing device mounted to the vehicle body and electrically connected to the control device, the existing device being different from the additional device,
wherein the at least one electric control unit executes:
an additional control section program which performs a first control to perform an additional function obtained by use of the additional device, when the control device determines that the additional device is connected to the control device; and
a change control section program which performs a second control in such a manner that an existing function obtained by use of the existing device is changeable from the existing function in a state in which the additional device is not connected to the control device, when the control device determines that the additional device is connected to the control device,
wherein the additional device required to obtain the additional function functions as a switching device for changing the existing function.

2. The vehicle according to claim 1,
wherein the control device contains therein an identification signal unique to the additional device which is transmitted from the additional device, and determines whether or not the additional device is connected to the control device based on whether or not a signal transmitted from the additional device includes the identification signal.

3. The vehicle according to claim 1,
wherein the change control section program changes a driving assist control for assisting a driving operation performed by a rider, from the driving assist control in the state in which the additional device is not connected to the control device.

4. The vehicle according to claim 3,
wherein the existing function performed by the driving assist control includes at least one of a quick shift function, an anti-lock brake function, and a steering damping function.

5. The vehicle according to claim 3,
wherein the change control section program allows the rider to select a content of driving assist of the driving operation in such a manner that the driving assist is changeable from the driving assist in the state in which the additional device is not connected to the control device.

6. The vehicle according to claim 5,
wherein the content of the driving assist of the driving operation includes at least one of whether or not to enable a quick shift function to be performed, whether or not to enable an anti-lock brake function to be performed, and a relative damping rate of a steering damper.

7. The vehicle according to claim 6,
wherein the existing device includes at least one of a driving device, a brake device, a damper device, a steering device, and a driving power transmission device.

8. The vehicle according to claim 1,
wherein the additional device is connected to the control device according to a communication protocol by which the existing device communicates signals to and from the control device.

9. A control method of a vehicle in which an existing device is mounted to a vehicle body and an additional device is removably mountable to the vehicle body, the control method comprising:
at at least one electric control unit of the vehicle:
when it is determined that the additional device is mounted to the vehicle body,
performing a first control to perform a function obtained by use of the additional device, and performing a second control in such a manner that an existing function obtained by use of the existing device is changeable from the existing function in a state in which the additional device is not mounted to the vehicle body; and
causing the additional device required to obtain the additional function to function as a switching device for changing the existing function.

10. The control method according to claim 9,
wherein the first control includes at least one of a traction control, an anti-wheelie control, and a launch control which are performed based on a bank angle and a pitch angle of the vehicle body.

11. The control method according to claim 9,
wherein the additional device includes at least one of an inertia sensor and an actuator.

* * * * *